Figure 1:
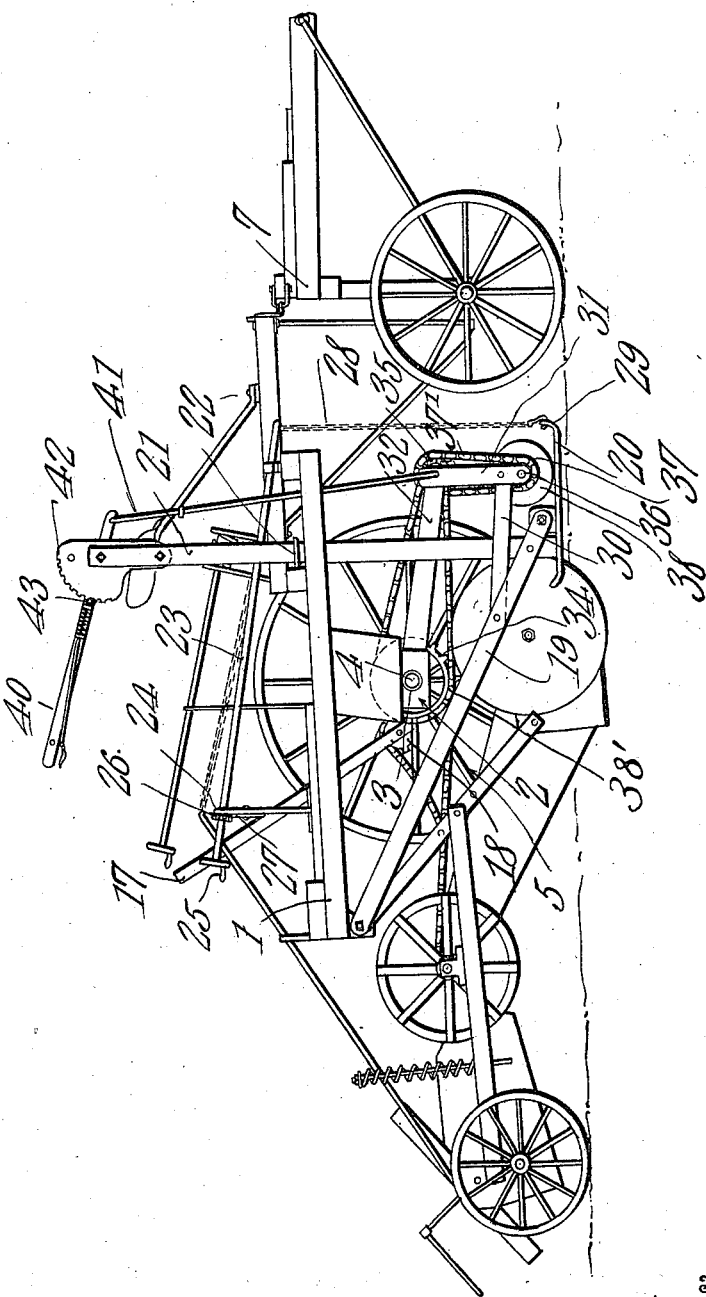

A. CLARK.
BEET HARVESTER.
APPLICATION FILED MAY 21, 1909.

963,868.

Patented July 12, 1910.
2 SHEETS—SHEET 1.

Inventor
Arnold Clark.

Witnesses

By C. A. Snow & Co.
Attorneys

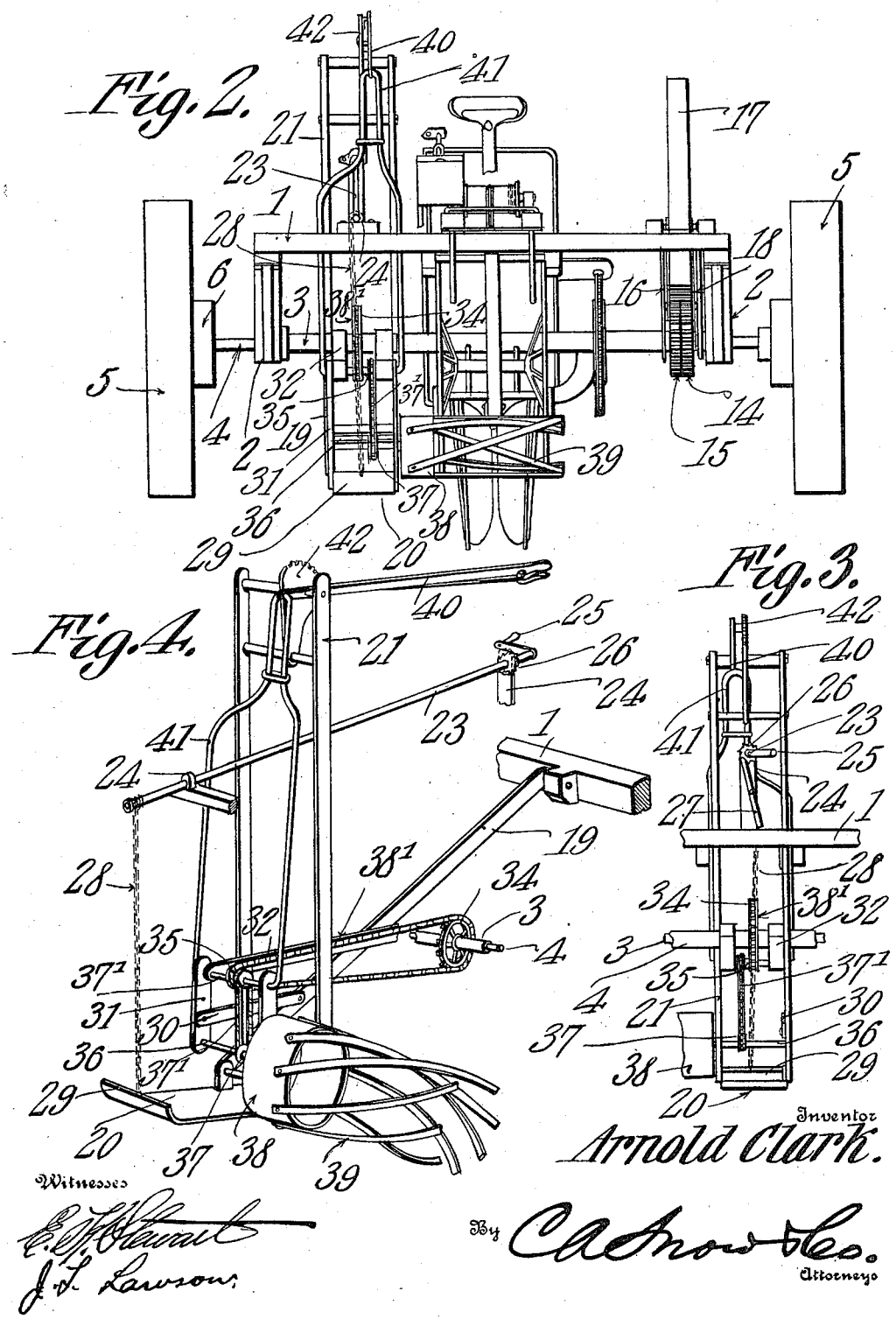

UNITED STATES PATENT OFFICE.

ARNOLD CLARK, OF LATTY, OHIO.

BEET-HARVESTER.

963,868.  Specification of Letters Patent.  Patented July 12, 1910.

Application filed May 21, 1909. Serial No. 497,382.

*To all whom it may concern:*

Be it known that I, ARNOLD CLARK, a citizen of the United States, residing at Latty, in the county of Paulding and State of Ohio, have invented a new and useful Beet-Harvester, of which the following is a specification.

This invention has relation to beet harvesters and it consists in the novel construction and arrangement of its parts as hereinafter shown and described.

The object of the invention is to provide a harvester of the character indicated in which is provided an adjustable series of rotating knives which are adapted to cleave the tops from the beets as they stand in the ground. In conjunction with the beet-topping mechanism as indicated a runner is provided which is also adjustable and which is adapted to travel upon the surface of the soil and bear the weight of the topping mechanism thereby relieving the frame of the machine of the weight of the said cutting mechanism.

In the accompanying drawings,—Figure 1 is a side elevation of the beet harvester. Fig. 2 is a front elevation of the same. Fig. 3 is a rear elevation of a portion of the topping mechanism. Fig. 4 is a perspective view of the topping mechanism detached from the harvester.

The harvester comprises a frame 1 which is provided at its opposite side with pendent bearings 2, in one of which is journaled a sleeve 3. An axle shaft 4 is journaled in said sleeve and the other bearing 2 and upon the ends of the said shaft are journaled traction wheels 5. Ratchet escapement devices 6 are connected with the said traction wheels and the said axle shaft and when the wheels are turning in a forward direction, the said shaft rotates with the same, but when the wheels 5 rotate rearwardly the said ratchet devices permit escapement between the movement of the wheels and the said axle shaft whereby the shaft may remain at rest. A tongue truck is located in advance of the frame 1 and supports the forward portion thereof in a usual manner.

A gear wheel 14 is fixed to the axle shaft 4 and a gear wheel 15 is fixed to the sleeve 3. The said gear wheels are adjacent each other. Arms 16 have bearings at their lower end portions which receive the said axle shaft 4 and sleeve 3, respectively, and a lever 17 is fulcrumed between the said arms. A gear wheel 18 is journaled for rotation at the lower end of the lever 17 and at times it is adapted to be swung so that it may mesh with both the gear wheels 14 and 15 above mentioned. Thus it will be seen that as the machine is run along the surface of the ground and the traction wheels 5 rotate in a forward direction, rotary movement is transmitted through the escapement devices 6 to the axle shaft 4 and when the lever 17 is swung so that the gear wheel 18 is in mesh with the gear wheels 14 and 15, rotary movement is transmitted through the gear wheel 14 and the gear wheel 18 to the gear wheel 15 and the sleeve 3.

A shoe frame 19 is pivotally connected at its rear end to the rear portion of the frame 1 and extends in an inclined position forwardly, under the axle shaft 4. A shoe 20 is pivotally mounted at the lower forward end of the frame 19. Uprights 21 are pivotally connected at their lower ends with the forward portion of the shoe frame 19 and extend up through guides 22 provided upon the frame 1. A shaft 23 is journaled for rotation in bearings 24 mounted upon the frame 1 and is provided with a crank handle 25. A ratchet disk 26 is fixed to the shaft 23 and is adapted to be engaged by a pawl 27 which is pivotally mounted upon the rear bearing 24 provided for the shaft 23. A chain 28 is attached at one end to the forward end of the shaft 23, and at its lower end is attached to the forward end of the shoe 20. The forward end of the said shoe is upturned as at 29. The shoe 20 and the frame 19 are adapted to support the weight of the knife frame and the knife mechanism hereinafter to be described. Links 30 are pivotally connected at their rear ends with the lower forward portion of the shoe frame 19 and at their forward ends are pivotally connected with a knife frame 31. Links 32 are pivotally connected at their rear ends with the sleeve 3 and at their forward ends are pivotally connected with the said knife frame 31. A sprocket wheel 34 is fixed to the sleeve 3 between the rear ends of the links 32. A sprocket wheel 35 is journaled for rotation in the upper portion of the knife frame 31. A shaft 36 is journaled for rotation in the lower portion of the knife frame 31. A sprocket wheel 37 is fixed to the shaft 36. A sprocket chain 38' passes around the sprocket wheels 34 and 35 and a sprocket chain 37' passes around the wheel 37 and the sprocket wheel 35. A head 38 is fixed to the inner end of the shaft 36 and blades 39 are fixed at their ends to the periphery of the said head 38. The said blades 39 are preferably spirally disposed and the ends opposite the ends that are attached to the head 38 are disconnected from other parts of the machine.

The knives 39 rotate about the axis of the shaft 36 as the said shaft rotates and consequently as the machine is drawn along a row of plants, the said knives will sever the tops from the roots or the body portions of the beets, and by reason of the fact that the said knives are spirally disposed, they sever the tops from the beets with a shearing cut which has a tendency to remove the tops without tearing the beets.

A lever 40 is fulcrumed upon the uprights 21 and at the upper end thereof a link 41 connects the working end of the lever 40 with the knife frame 31. A gear segment 42 is fixed to the upper end of one of the uprights 41 and the lever 40 carries a spring actuated pawl 43 which is adapted to engage the teeth of the segment 42. By means of the lever mechanism 40 and its connection with the knife frame 31, means are provided for raising and lowering the knife frame with relation to the shoe 20 and for holding the same in an adjusted position. Thus means are provided for causing the knives 39 to operate upon the tops of the beets at any desired point with relation to the surface of the soil. It will be seen that when the shaft 23 rotates and the chain 28 is wound thereon that the forward end of the shoe frame 19 together with the shoe and the knife frame 31 will be raised above the surface of the ground, that is to say after the knife frame 31 has been adjusted with relation to the shoe 20 by turning the shaft 23 the said knife frame may be adjusted vertically together with the shoe without changing the relative position of the knife frame with respect to the shoe.

Having described my invention what I claim as new and desire to secure by Letters Patent is:—

1. A beet harvester comprising a main frame, a shoe frame pivotally connected with the main frame, a shoe carried by the shoe frame, means for raising and lowering the shoe frame, a knife frame pivotally mounted upon the shoe frame, and means for adjusting the knife frame with relation to the shoe frame.

2. A beet harvester comprising a main frame, a shoe frame pivotally connected with the main frame, a shoe carried by the shoe frame, a knife frame pivotally mounted upon the shoe frame, means for adjusting the knife frame with relation to the shoe frame, and means for moving the shoe frame and the main frame simultaneously.

3. A beet harvester comprising a main frame, a shoe frame attached thereto, a shoe pivoted to the shoe frame and a knife frame mounted upon the shoe frame.

4. A beet harvester comprising a main frame, a shoe frame pivoted thereto, a shoe pivoted to the shoe frame, and a knife frame mounted upon the shoe frame.

5. A beet harvester comprising a main frame, a shoe frame pivoted thereto, a shoe pivoted to the shoe frame, and a knife frame adjustably mounted upon the shoe frame.

6. A beet harvester comprising a main frame, a shoe frame attached thereto, a knife frame adjustably mounted upon the shoe frame, and a vertically rotating knife carried by the knife frame.

7. A beet harvester comprising a main frame, a shoe frame attached thereto, a shoe pivoted to the shoe frame, a knife frame mounted upon the shoe frame, and a vertically rotating knife carried by the knife frame.

8. A beet harvester comprising a main frame, a shoe frame pivoted thereto, a shoe pivoted to the shoe frame, a knife frame mounted upon the shoe frame, and a vertically rotating knife carried by the knife frame.

9. A beet harvester comprising a main frame, a shoe frame pivoted thereto, a shoe pivoted to the shoe frame, a knife frame adjustably mounted upon the shoe frame and a vertically rotating knife carried by the knife frame.

In testimony that I claim the foregoing as my own, I have hereto affixed my signature in the presence of two witnesses.

ARNOLD $\underset{\text{mark}}{\overset{\text{his}}{\times}}$ CLARK.

Witnesses:
D. J. HARKLESS,
H. H. WALLAR.